Dec. 8, 1970   J. H. McNAMARA   3,546,052
ARTIFICIAL ROCKS HAVING SHELLS FILLED WITH FLUENT MATERIAL
Filed May 11, 1967

INVENTOR
JULIE H. McNAMARA
BY
BLAIR BUCKLES CESARI & ST.ONGE
ATTORNEY 3,546,052
ARTIFICIAL ROCKS HAVING SHELLS FILLED
WITH FLUENT MATERIAL
Julie H. McNamara, 31 Bellevue Place,
New London, Conn. 06301
Filed May 11, 1967, Ser. No. 637,712
Int. Cl. B44f 7/00
U.S. Cl. 161—19                    2 Claims

ABSTRACT OF THE DISCLOSURE

The disclosure pertains to man-made rock in the form of boulders and stones suitable for decorative applications and to the method of formation thereof. The disclosed artificial boulders and stones are formed having a molded outer shell, the exterior surface thereof being conformed, textured and colored in simulation of their natural counterparts. The shell is collapsible for convenient shipment to the site of decorative use. An aperture is formed in the shell through which a fluid or suitable particulate material is introduced to fill out the shell, giving it the three-dimensional conformation of boulders and stones. A plug removably inserted in the aperture retains the fill substance within the shell.

BACKGROUND OF THE INVENTION

Figure 1:
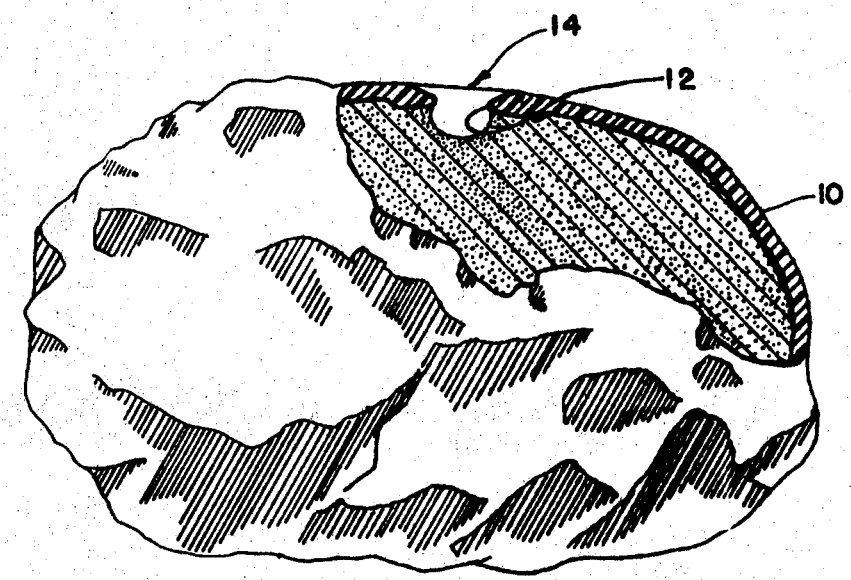

In many locales, such as Florida, indigenous boulders and stones are rare. Consequently, inhabitants of such areas desiring rock gardens or rock displays in their homes, yards, and patios must incur great expense in procuring suitable boulders and stones. Rock must be transported from other areas where boulders and stones are in plentiful supply. Due to the great weight of boulders and stones suitably sized for decorative use, shipping charges alone are sizable indeed.

Many Floridians, for example, have resorted to coral as a rock substitute for decorative use. Although coral is indigenous to Florida, it is not readily obtainable since it is found primarily along the coast beneath the sea. Coral is considerably less durable than rock and in many instances possesses potentially injurious sharp edges. Moreover, coral does not possess the decorative appeal of rock.

Accordingly, it is a principal object of my invention to provide man-made rock in the form of boulders and stones which is inexpensive to manufacture in a wide variety of sizes and shapes on a mass production basis and can be inexpensively conditioned for decorative use on a do-it-yourself basis. The individual boulders and stones consist of a collapsible outer shell formed of a suitable flexible plastic material of appropriate durability and thickness. The exterior shell surface is provided with appropriate coloring, texturing and irregularities, i.e., crevices, indentations and protuberances, in facsimile of natural boulders and stones.

The shells are light weight and when compressed have little bulk. Thus they can be transported in quantity without significant expense. A plurality of such shells may be hand carried to the site of utilization. Each shell is provided with an aperture through which any desired substance is introduced to fill out the shell, giving it the bulk and three-dimensional conformation of its natural counterpart. The filling substance may be any inexpensive material readily available at or near the site of decorative use, as for example, air, water, but preferably a less fluent material such as sand, gravel, and soil. Alternatively, the shell may be filled with cement or other material capable of going from relatively fluent to a substantially solid state.

Once filled, a plug is inserted in the filling aperture of the shell, which may then be rolled over to orient the plugged aperture to an inconspicuous position in the undersurface of the shell.

Other objects of the invention will in part be obvious and will in part appear hereinafter.

The invention accordingly comprises the several steps and the relation of one or more of such steps with respect to each of the others, and the article possessing the features, properties, and relation of elements, which are exemplified in the following detailed disclosure, and the scope of the invention will be indicated in the claims.

Figure 2:
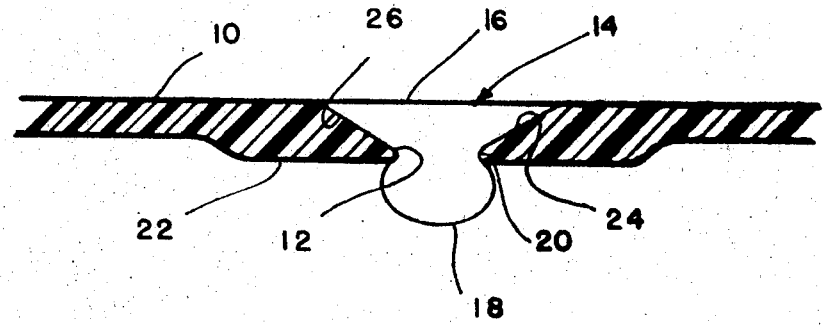

For a fuller understanding of the nature and objects of the invention, reference should be had to the following detailed description taken in connection with the accompanying drawing, in which:

FIG. 1 is a side elevational view, partially broken away, constructed according to my invention; and FIG. 2 is an enlarged fragmentary view of a portion of FIG. 1 showing the preferred plug construction.

DETAILED DESCRIPTION OF THE PREFERRED EMBODIMENT

Referring now to the drawings, the reference numeral 10 in FIG. 1 refers to a hollow shell having an aperture 12 closed off by a removable closure in the form of a plug, generally indicated at 14. The shell is formed of a suitable plastic material which is relatively flexible and yet substantially inelastic. Other desirable attributes of the shell are durability and the ability to withstand weathering. Such readily available plastics determined to be suitable for use in the present invention are, for example, polypropylene, fluorinated polypropylene, copolymers of fluorinated ethylene and propylene, and vinyl plastisol. Other applicable plastics will occur to those skilled in the art.

The shell 10 is ideally formed in a molding process such as, for example, blow molding or centrifugal casting. The forming mold surface is provided with appropriate texturing and irregularities such as to reproduce on the exterior shell surface a configuration simulating the surface appearance of natural rock. The plastic material is preferably pigmented to simulate natural rock coloration. Alternatively, the molded shell 10 may be painted in rock-like colors. It will also be appreciated that natural rock particles or synthetic rock-like particles may be incorporated in the plastic material prior to molding of the shell 10.

The mold used in forming the shell corresponds in size to the imitation rock size desired. Thus, for various sizes and shapes of imitation boulders and stones, different molds are used. This is made necessary by virtue of the preferred inelastic characteristic of the plastic material making up shell 10. It will be appreciated that if a strechable plastic were used, the shell 10, once filled, would not retain the rock-like characteristics originally imparted to it by the mold.

While the shell is suitably inelastic, it is nevertheless sufficiently flexible as to be readily collapsed after it has been formed. While maintained in a generally collapsed state, the shell 10 occupies relatively little space and is naturally light in weight. Thus, a large number of shells 10 can be shipped economically over long distances ultimately to the intended sites of decorative implementation.

The shells 10 and associated plugs 14, purchased from a retail outlet such as a garden supply store, may be conveniently transported home by those desiring rock gardens and rock displays at a fraction of the expense and effort involved in accumulating real boulders and stones. At or adjacent the intended position of display, the plug 14 is removed and the shell 10 is manipulated into generally the three-dimensional rock-like conformation imparted to it in the molding process. An inexpensive, readily available substance such as air or water is introduced through aperture 12 to fill out shell 10. Preferably, however, a less fluent substance or particulate material such as sand, gravel, or soil should be used as the core for the shell. If desired, the shell may be filled with cement, which, upon hardening, substantially provides the rigidity of natural rock.

Once the shell 10 is filled, the aperture 12 is sealed with plug 14. As best seen in FIG. 2, the plug, preferably made of the same material as the shell, has a flat head 16, a bulbous end 18 and a neck 20 of reduced diameter corresponding to the diameter of aperture 12. The interior surface of the shell adjacent the aperture 12 is thickened, as indicated at 22, to provide a degree of rigidity against insertion of the plug 14. As the plug is inserted, the edge of aperture 12 deforms to permit passage of the bulbous end 18 therethrough. The plug is lodged in place when the neck 20 is intimately surrounded by the edge of aperture 12. The shell portion surrounding the aperture is, in effect, countersunk, as indicated at 24, to conform with the conical undersurface 26 of the plug head 16 in order that the outer surface of the plug head, also of rock-like configuration and coloration, substantially blends with the adjacent exterior surface of the shell 10 to obscure the presence of the plug. Moreover, this adjacent exterior shell surface may be suitably contoured such as to further obscure plug 14. It is also contemplated that the artificial boulder or stone thus formed may be placed in its display position with the plugged aperture in the undersurface of the shell; being thus fully concealed. If the shell is filled with cement which has been permitted to set up, the plug 14 need not be used; the aperture being concealed by appropriately orienting the artificial boulder or stone in its display position.

It will be appreciated that the shells may be formed in a wide variety of shapes from generally flat to substantially round. Sizes may range up to many feet in girth. Many types of rock may be readily simulated. The inexpensive nature of the disclosed simulated rock economically justifies their disposal should the user relocate or elect to change decors. Moreover, by virtue of the construction of the disclosed simulated rock disposal presents no significant problem, unlike real boulders and stones.

It will also be appreciated that the present invention is adaptable to simulating decorative objects other than rock. For example, the plastic shells may be molded in facsimile of tree trunks. Even artifacts may be conducive to simulation with my invention. In other words, it is seen that any decorative object of significant size and/or weight may be simulated pursuant to the disclosed invention, thereby realizing the same advantages as obtained in the simulation of rock.

It will thus be seen that the objects set forth above, among those made apparent from the preceding description, are efficiently attained and, since certain changes may be made in carrying out the above method and in the disclosed article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A decorative article of manufacture comprising, in combination:
   (A) a hollow shell formed of a substantially inelastic, relatively flexible plastic material,
      (1) the exterior surface of said shell having the configuration and coloration simulating a rock,
      (2) said shell being normally of the size and conformation of the rock simulated and readily collapsible to a compact size in the absence of a substance filling its hollow interior;
   (B) means forming an aperture in said shell; and
   (C) a fluent particulate substance of the class including sand, gravel, soil and cement introduced into the interior of said shell through said aperture at the site of decorative implementation of said article,
      (1) said substance filling out said shell to restore it to the three-dimensional size and conformation of the decorative object simulated; and
   (D) a plug sealing said aperture to retain said substance within said shell.

2. The article defined in claim 1 wherein said shell is formed of polypropylene.

References Cited

UNITED STATES PATENTS

| | | | |
|---|---|---|---|
| 2,918,394 | 12/1959 | Smith | 117—138.8 |
| 3,097,105 | 7/1963 | Edmonds | 117—41 |
| 3,149,017 | 9/1964 | Ehrreich et al. | 161—36 |
| 3,234,741 | 2/1966 | Ionides | 61—38 |
| 3,374,635 | 3/1968 | Crandall | 61—38 |
| 3,403,064 | 9/1968 | Bellamy | 161—147X |
| 1,906,325 | 5/1933 | Martin | 46—87 |
| 2,629,134 | 2/1953 | Molitor | 264—310 |
| 3,078,616 | 2/1963 | Selwyn-Smith | 161—21X |
| 3,310,615 | 3/1967 | Bender | 264—45 |
| 3,381,718 | 5/1968 | Darrow | 156—287X |

JOHN T. GOOLKASIAN, Primary Examiner

H. F. EPSTEIN, Assistant Examiner

U.S. Cl. X.R.

52—316